United States Patent [19]
Kohn

[11] Patent Number: 5,546,551
[45] Date of Patent: Aug. 13, 1996

[54] METHOD AND CIRCUITRY FOR SAVING AND RESTORING STATUS INFORMATION IN A PIPELINED COMPUTER

[75] Inventor: Leslie D. Kohn, San Jose, Calif.

[73] Assignee: Intel Corporation, Santa Clara, Calif.

[21] Appl. No.: 350,376

[22] Filed: Dec. 5, 1994

Related U.S. Application Data

[63] Continuation of Ser. No. 939,956, Sep. 3, 1992, abandoned, which is a continuation of Ser. No. 480,076, Feb. 14, 1990, abandoned.

[51] Int. Cl.$^6$ ........................................................ G06F 9/38
[52] U.S. Cl. ................... 395/375; 364/231.8; 364/265.6; 364/DIG. 1; 395/600
[58] Field of Search .................................. 395/650, 700, 395/600, 375

[56] References Cited

U.S. PATENT DOCUMENTS

| | | | |
|---|---|---|---|
| 3,736,566 | 5/1973 | Anderson et al. | 364/200 |
| 4,566,063 | 1/1986 | Zolnowsky et al. | 364/200 |
| 4,783,783 | 11/1988 | Nagai et al. | 364/200 X |
| 4,893,233 | 1/1990 | Denman et al. | 364/200 |
| 4,985,825 | 1/1991 | Webb, Jr. et al. | 364/200 |
| 5,003,458 | 3/1991 | Yamaguchi et al. | 364/200 |

OTHER PUBLICATIONS

J. Crawford and P. Gelsinger, *Programming the 80386*, pp. 553–589 (Sybex Inc. 1987).
Vol. I (Microprocessor) of *Microprocessor and Peripheral Handbook*, Intel Corp., pp. 4–1 through 4–128 (Oct. 1987).

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

A method and circuitry for handling status information in a computer is described. If there are additional pipeline states to restore, then a first operation is executed. All traps are disabled for a next advancement of the pipeline. A first logical value is stored into an update bit position associated with a first stage of the pipeline. A value is stored into a status bit position associated with the first stage of the pipeline. If the value of the update bit is not associated with the last stage of the pipeline, then the pipeline is advanced by one stage. The value of the update bit position is propagated unchanged to a next stage of the pipeline and becomes associated with that stage of the pipeline. The value of the status bit position is propagated unchanged to the next stage of the pipeline and becomes associated with that stage of the pipeline. If the value of the update bit is not associated with the last stage of the pipeline, then the above steps are repeated.

10 Claims, 12 Drawing Sheets

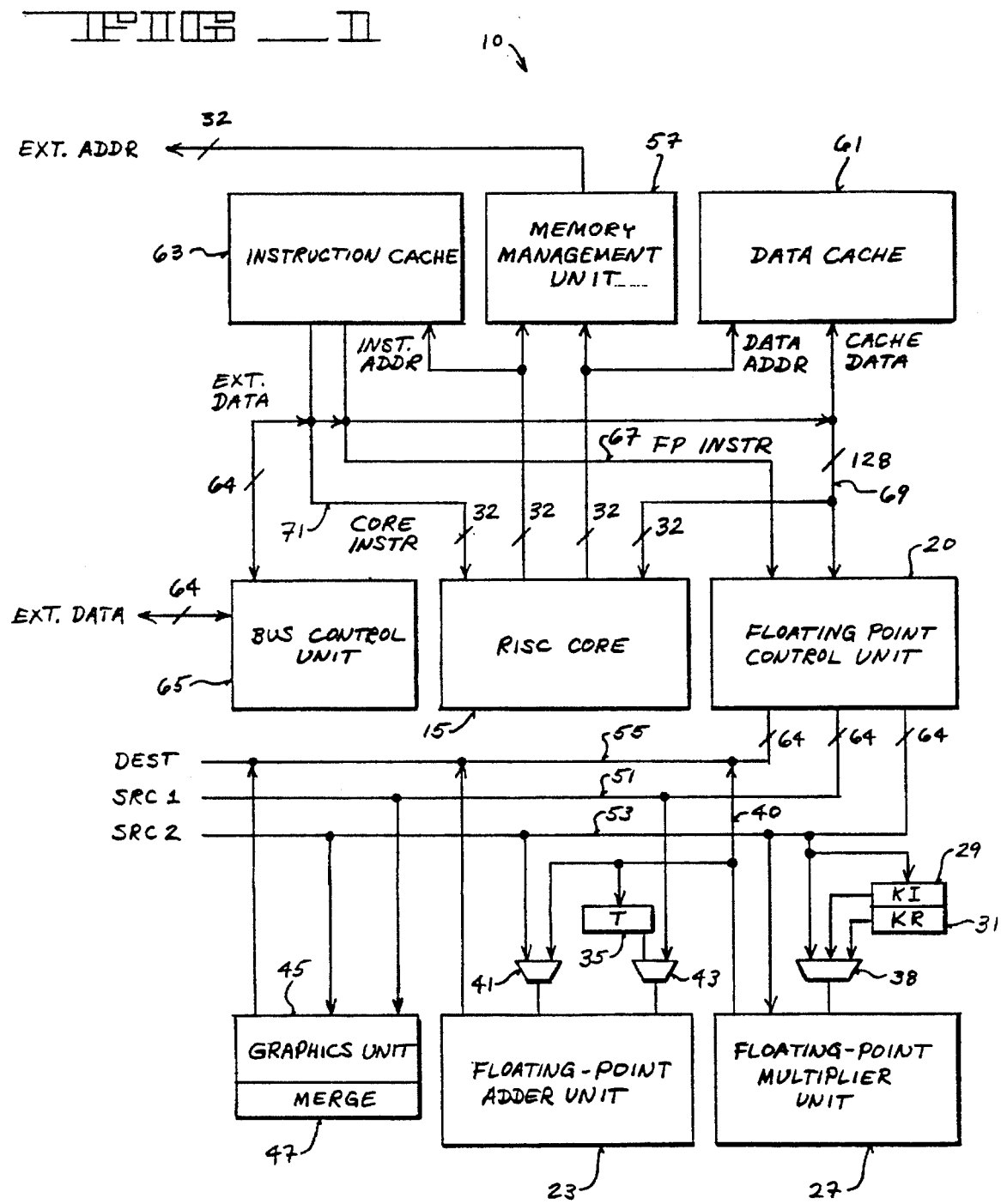

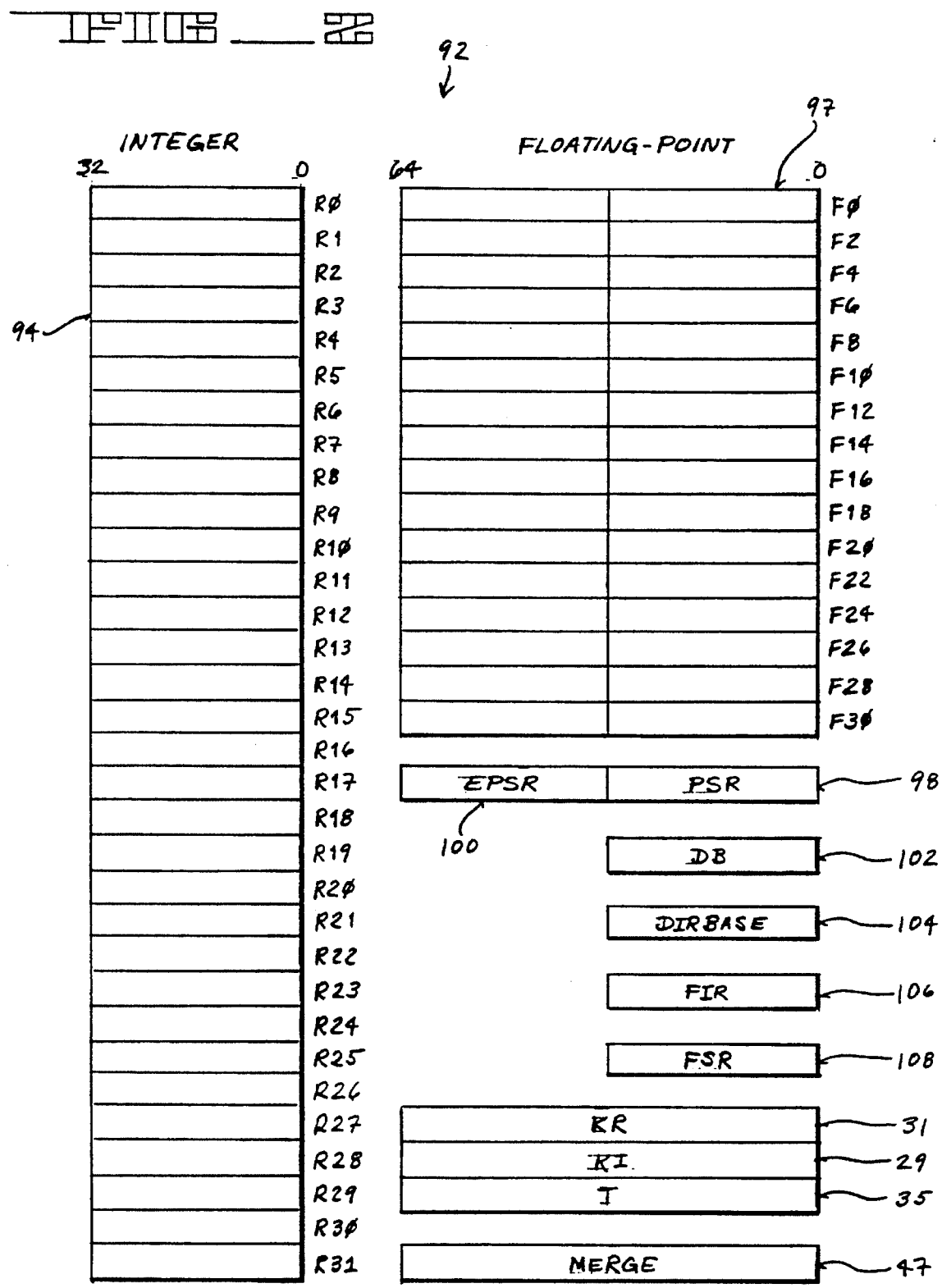

FIG. 3B

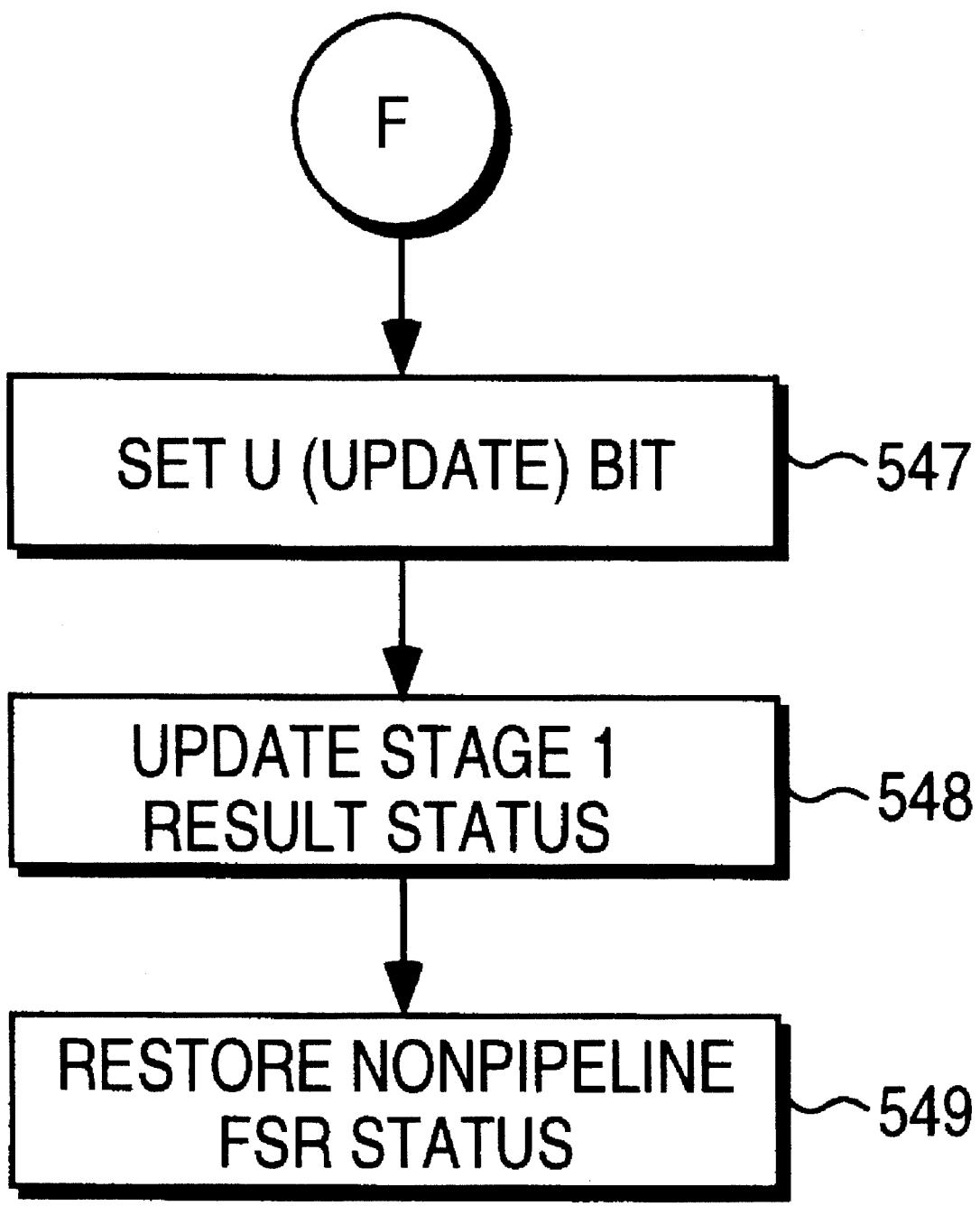

METHOD AND CIRCUITRY FOR SAVING AND RESTORING STATUS INFORMATION IN A PIPELINED COMPUTER

This is a continuation of application Ser. No. 07/939,956, filed Sep. 3, 1992, now abandoned, which is a continuation of application Ser. No. 07/480,076, filed Feb. 14, 1990, now abandoned.

FIELD OF THE INVENTION

The present invention pertains to the field of computer architecture with respect to the handling of traps and interrupts in a pipelined digital system. More particularly, this invention relates to a method and circuitry for handling status information in a computer that employs pipelining.

BACKGROUND OF THE INVENTION

One prior computer architecture technique to increase computer performance is the use of parallelism. One type of parallelism is "pipelining." Pipelined architecture treats each operation as a series of more primitive operations called stages that can be executed in parallel. One type of pipelining is the pipelining of the execution of instructions.

Pipelining poses special problems with respect to the handling of traps. Traps are caused by external interrupts or by exceptional conditions (also referred to as "exceptions") detected in programs. Traps cause the interruption of the normal program flow so that a special program known as a trap handler can be executed. Examples of exceptions include overflows, underflows, and inexact results.

If a trap occurs, instruction execution should be stopped at some point in time. The trap handler should then be executed. Instruction execution should then be resumed at some point in time.

In one prior technique, hardware interlocks are used so that additional operations are not permitted until it can be determined that no trap has occurred on previous operations. According to this technique, an instruction execution pipeline is stopped as soon as a trap occurs. After the trap is handled, the instruction stream is restarted at the point at which the trap occurred. One disadvantage of this technique, however, is that it reduces performance.

In another prior technique, once a trap is detected, all instructions still in the pipeline are executed. The results of the execution of those instructions are stored. Status information associated with each of those instructions is not stored, however. Pipelined instruction execution is then resumed starting with the next instruction that has not already been executed. In other words, the next instruction executed is an instruction that was not in the pipeline when the trap occurred. One disadvantage of this technique is that simply storing the results of the instructions still in the pipeline when the trap occurred and not the respective status information is not sufficient, given that those instructions could have caused further traps. Thus, traps could be lost if other exceptions would have been generated by those instructions. One might know that that one had a floating-point error, for example, but one might not know any other exceptions that also occurred. One prior way to overcome this problem is to have a mode bit in software. If the mode bit is set, then pipelining is not permitted. If the mode bit is zero, then pipelining is permitted. If the mode bit is set, however, the performance advantages of pipelining are lost. But if the mode bit is zero and pipelining is permitted, then traps might be lost during execution.

In another prior technique, the software visible state information for a particular operation is not updated until all operations preceding that particular operation are finished. For example, for multiple pipelines, assume that (1) the instruction in the first pipeline is a multiplication instruction A←B*C, which takes five clock cycles to complete and (2) the instruction in the second pipeline is an addition instruction X←X+Y, which takes one clock cycle to complete. If a trap occurs on the fifth clock of the first pipeline, one must avoid having updated the state information for the second pipeline. One prior way of accomplishing this is to provide a special bypass mechanism together with additional registers that store state information prior to updating such that only the state information prior to updating is visible. One disadvantage of this technique, however, is the requirement of additional hardware.

In yet another prior technique, software requires that all pipelined operations be finished before any traps are taken. One disadvantage of this technique is that one cannot restart an exception. With this technique, one does not get an exception until the pipeline is finished. One, however, will have done operations in the meantime that are not reexecutable. For example, if the first instruction is A←B*C and the second instruction is X←X+1, one cannot restart the pipeline after a trap given that the value of X has changed. Thus, this technique merely gives one an error message and does not allow one to restart the pipeline.

SUMMARY AND OBJECTS OF THE INVENTION

In view of limitations of known systems and techniques, one of the objectives of the present invention is to allow a trap to be taken in the middle of a sequence of computer operations and to allow resumption of the sequence of computer operations at a later time, while minimizing hardware and without compromising computer performance with interlocks.

These and other objects of the invention are provided for by a method and circuitry for handling status information in a computer. If there are additional pipeline states to restore, then a first operation is executed. All traps are disabled for a next advancement of the pipeline. A first logical value is stored into an update bit position associated with a first stage of the pipeline. A value is stored into a status bit position associated with the first stage of the pipeline. If the value of the update bit is not associated with the last stage of the pipeline, then the pipeline is advanced by one stage. The value of the update bit position is propagated unchanged to a next stage of the pipeline and becomes associated with that stage of the pipeline. The value of the status bit position is propagated unchanged to the next stage of the pipeline and becomes associated with that stage of the pipeline. If the value of the update bit is not associated with the last stage of the pipeline, then the above steps are repeated.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 1 is a block diagram of the architecture of a computer processor;

FIG. 2 illustrates registers of the processor;

FIG. 3 illustrates a floating-point status register of the processor;

FIGS. 6A through 6F set forth steps for restoring pipeline states of the processor.

DETAILED DESCRIPTION

Figure 4:
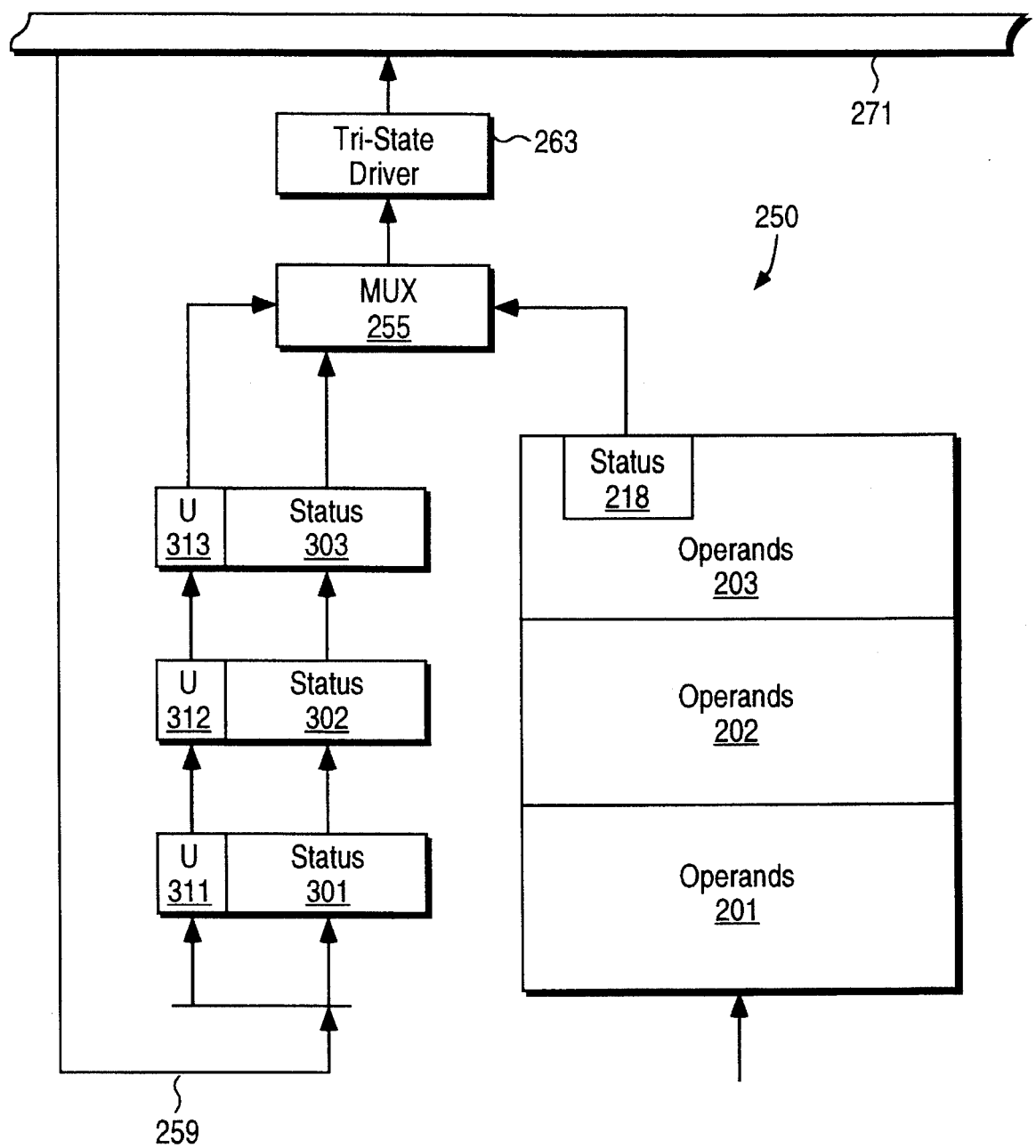
FIG. 4 illustrates a status mechanism for the processor.

FIG. 1 sets forth a block diagram of the architecture of a computer processor 10 that implements a preferred embodiment of the present invention. Microprocessor 10 functions as a 32/64-bit IEEE-compatible floating-point processor, a 32-bit reduced instruction set computer ("RISC") integer processor, and a 64-bit three-dimensional graphics processor.

Microprocessor 10 employs a four-stage pipeline. The four stages of the pipeline comprise a Fetch Instruction stage, a Decode Instruction stage, an Execute Instruction stage, and a Write-Back stage.

For floating-point instructions, the Execution stage is subdivided into more pipelined stages, each consuming one clock. Moreover, there are four different types of floating-point pipelines: one for floating-point multiplier unit 27, one for floating-point adder unit 23, one for graphics unit 45, and one for pipelined floating-point loads. The adder execution pipeline has three stages. Graphics unit 45 has a one stage pipeline. The pipelined load execution pipeline has three stages.

A multiplier pipeline employing single-precision input operands in the pipeline has three stages. A multiplier pipeline employing double-precision input operands in the pipeline has two stages. A single-precision operand is a 32-bit binary floating-point number with a sign bit along with exponent bits and fraction bits. A double-precision operand is a 64-bit binary floating-point number with a sign bit along with exponent bits and fraction bits.

In FIG. 1, RISC core unit 15—also referred to as integer core unit 15—is the administrative center of microprocessor 10. Core unit 15 fetches both integer and floating-point instructions. Core unit 15 contains the integer register file 94 of FIG. 2. Core unit 15 of FIG. 1 is pipelined, and decodes and executes load, store, integer, bit, and control transfer operations.

Floating-point control unit 20 issues floating-point instructions and operands to floating-point adder unit 23 and floating-point multiplier unit 27. Floating-point control unit 20 handles all source and result errors due to floating-point operations. Floating-point control unit 20 has the five port 128-byte register file 97 of FIG. 2, which is configurable as 8 by 128-bit registers, 16 by 64-bit registers, or 32 by 32-bit registers.

Floating-point adder unit 23 performs floating-point addition, floating-point subtraction, comparisons, and conversions. Floating-point multiplier unit 27 performs floating-point and integer multiply and floating-point reciprocal operations.

Graphics unit 45 of FIG. 1 has 64-bit integer logic that supports three-dimensional graphics drawing algorithms. Graphics unit 45 contains special purpose MERGE register 47. Buses Src1 51, Src2 53, and Dest 55 are each coupled to graphics unit 45, floating-point adder unit 23, floating-point multiplier unit 27, and floating-point control unit 20. Registers KI 29, KR 31, and T 35 are special-purpose registers used by certain dual-operation floating-point instructions.

Microprocessor 10 includes instruction cache 63 and data cache 61. Core instruction bus 71 couples RISC core 15 with instruction cache 63. Data bus 69 is coupled to both RISC core 15 and floating-point control unit 20. Floating-point instruction bus 67 couples floating-point control unit 20 with instruction cache 63. Data bus 69 couples floating-point control unit 20 with data cache 61.

Memory management unit 57 performs the translation of an address from the linear logical address space to the linear physical address for external data and instruction access. With respect to data, bus control unit 65 provides a data interface between an external bus and microprocessor 10.

FIG. 2 illustrates registers 92 of microprocessor 10. Registers 92 include integer register file 94, floating-point register file 97, and control registers psr 98, epsr 100, db 102, dirbase 104, fir 106, and fsr 108. Registers 92 also include special purpose registers KR 31, KI 29, T 35, and MERGE register 47.

The control registers psr 98, epsr 100, db 102, dirbase 104, fir 106, and fsr 108 are accessible only by load and store to control register instructions. The integer registers 94 (comprised of integer registers r0 through r31) and floating-point registers 97 (comprised of floating point registers f0 through f31) are accessed by arithmetic operations and load and store instructions.

Figure 3B:
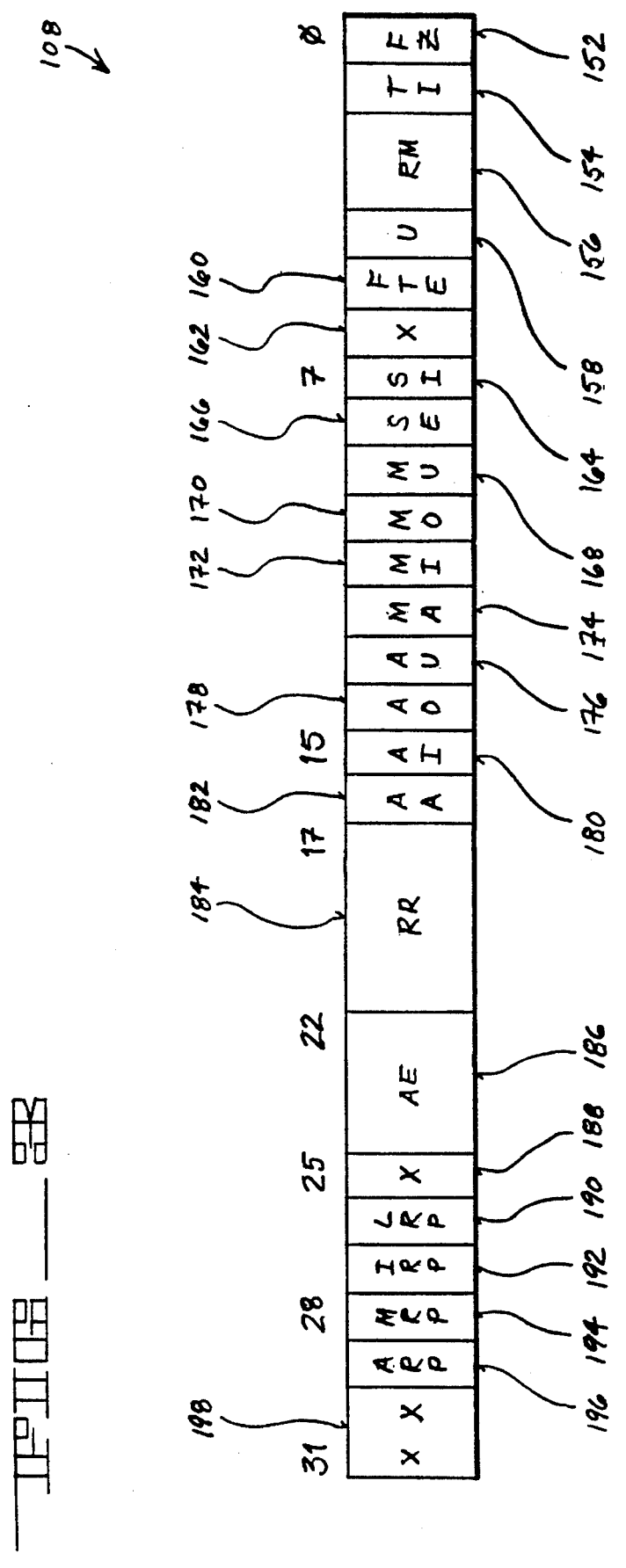

FIG. 3 illustrates the format of floating-point status register fsr 108. Register fsr 108 contains the floating-point trap and rounding-mode status for the current process.

The result-status bits comprise AA bit 182, AI bit 180, AO bit 178, AU bit 176, AE bits 186, MA bit 174, MI bit 172, MO bit 170, and MU bit 168. When read from the floating-point status register 108, the result status bits AA 182, AI 180, AO 178, AU 176, and AE 186 describe the last-stage result of floating-point adder 23. When read from fsr 108, the result-status bits MA 174, MI 172, MO 170, and MU 168 describe the last-stage result of floating-point multiplier unit 27.

After a floating-point operation is started in a given unit (i.e., adder 23 or multiplier 27), the result status bits of that unit are undefined until the point at which the result exceptions are reported. In a floating-point dual operation instruction (e.g., add-and-multiply or subtract-and-multiply), both the multiplier 27 and the adder 23 may set exception bits. The result status bits for a particular unit remain set until the next operation that uses that unit.

AA bit 182 is the adder add one bit. AA bit 182, if set, indicates that the floating-point adder 23 rounded the result by adding one least significant bit.

The AI bit 180 is the adder inexact bit. AI bit 180, if set, indicates that the last-stage result of the floating-point adder unit 23 is inexact.

AO bit 178 is the adder overflow bit. If AO bit 178 is set, that indicates an overflow exception condition for the last stage result of the floating-point adder 23.

AU bit 176 is the adder underflow bit. If AU bit 176 is set, that indicates an underflow exception condition for the last stage result of adder 23.

Bits AE 186 are the adder exponent bits. The high-order three bits of the 11-bit exponent of adder 23 results are stored in AE field 186. The trap handler needs the AE bits when overflow or underflow occurs with double precision inputs and single precision outputs.

MA bit 174 is the multiplier add one bit. If MA bit 174 is set, this indicates that the floating-point multiplier 27 rounded the result by one least significant bit.

MI bit 172 is the multiplier inexact bit. MI bit 172 is set when the last-stage result of multiplier unit 27 is inexact.

MO bit 170 is the multiplier overflow bit. If MO bit 170 is set, then this indicates an overflow exception condition for the last stage result of multiplier 27.

MU bit 168 is the multiplier underflow bit. If MU bit 168 is set, this indicates an underflow exception condition for the last stage result of multiplier unit 27.

The U (i.e., Update) bit 158, if set in the value that is loaded into floating-point status register 108 by a store-to-control-register ("st.c") instruction, enables updating of the result status bits AE 186, AA 182, AI 180, AO 178, AU 176, MA 174, MI 172, MO 170, and MU 168 in the first stage of the floating-point adder 23 and floating-point multiplier 27 pipelines. Update bit 158 is also referred to as valid bit 158. If update bit U 158 is clear, the result status bits are unaffected by a st.c instruction. A trap handler that has interrupted a pipelined operation sets U bit 158 to enable restoration of the result-status bits in the pipeline.

Floating-point status register 108 also includes Flush Zero bit 152, Trap Inexact bit 154, Rounding Mode bits 156, Floating-Point Trap Enable bit 160, reserved bit 162, Sticky Inexact bit 164, Source Exception bit 166, Result Register bits 184, reserved bit 188, Load Pipe Result Precision bit 190, Integer (Graphics) Pipe Result Precision bit 192, Multiplier Pipe Result Precision bit 194, Adder Pipe Result Precision bit 196, and reserved bits 198.

FIG. 4 illustrates status mechanism 250 for microprocessor 10. A three-stage execution pipeline 200 is comprised of a first stage 201, a second stage 202, and a third stage 203. Operands are initially loaded into the first stage 201 of pipeline 200. Pipeline 200 is advanced, and each stage of pipeline 200 holds operands. The operands are also referred to as results.

As discussed above, the number of pipelined stages for the different types of floating point execution pipelines for microprocessor 10 ranges from one to three. FIG. 4 illustrates a three stage floating-point execution pipeline.

Status bits 218 of FIG. 4 hold the status information calculated by the last stage of pipeline 200. Status bits 218 are computed by hardware from the contents of the last stage 203 of pipeline 200. Status bits 218 reflect the status of the last stage 203 of pipeline 200. Status bits 218 are also referred to as the normal result-status bits 218 or the hardware status bits 218. Status bits 218 are in pipeline 200.

Result-status bits 218 comprise adder-add-one bit 182, adder-inexact bit 180, adder-overflow bit 178, adder underflow bit 176, adder exponent bits 186, multiplier-add-one bit 174, multiplier-inexact bit 172, multiplier-overflow bit 170, and multiplier-underflow bit 168.

Status bits 301, 302, and 303; update bits (i.e., U bits) 311, 312, and 313; multiplexer 255, tri-state driver 263, and control register bus 271 of FIG. 4 all reside in floating-point control unit 20 of FIG. 1. Status bits 301 and U bit 311 are associated with stage 201 of pipeline 200. Status bits 302 and U bit 312 are associated with stage 202 of pipeline 200. Status bits 303 and U bit 313 are associated with stage 203 of pipeline 200.

Status bits 301, 302, and 303 each comprise adder-add-one bit 182, adder-inexact bit 180, adder-overflow bit 178, adder underflow bit 176, adder exponent bits 186, multiplier-add-one bit 174, multiplier-inexact bit 172, multiplier-overflow bit 170, and multiplier-underflow bit 168.

The value of update bit 313 determines whether control register bus 271 will receive status bits 303 or status bits 218. The value of update bit 213 is applied to multiplexer 255. If update bit 313 is a logical one, then status bits 303 are passed by multiplexer 255 via tri-state driver 263 to control register bus 271. If update bit 313 is a logical zero, then status bits 218 are passed by multiplexer 255 via tri-state driver 263 to control register bus 271.

Status bits 303 are derived from software. The process is as follows. Update bit 311 can be set to a logical one by a store-to-control-register instruction. The store-to-control register instruction can also place in status bits 301 the relevant values of AA 182, AI 180, AO 178, AU 176, AE 186, MA 174, MI 172, MO 170, and MU 168. The store-to-control-register instruction stores to U bit 311 and status bits 301 from control register bus 271 via lines 259. During the execution of the store-to-control-register instruction, tri-state driver 263 is turned off.

By repeatedly advancing the pipeline of status bits 301, 302, and 303, status bits 303 eventually receive the value initially loaded into status bits 301 by the store-to-control-register instruction. Moreover, that same advancement advances update bits 311, 312, and 313. Therefore, update bit 313 eventually receives the value of update bit 311.

Update bit 311 is cleared to a logical zero each time the pipeline is advanced. The software can, however, instead set update bit 311 to a logical one.

Status mechanism 250 appears to the software as if it were floating-point status register fsr 108. A store-to-control register instruction st.c that specifies fsr 108 as the control register writes to U bit 311 and status bits 301.

The execution of a load-from-control-register instruction designating fsr 108 as the control register causes either status bits 303 or status bits 218 to be read, depending upon the value of the update bit 313. Again, if the value of U bit 313 is a logical one, then status bits 303 are passed to control bus 271 and thus are read. If, however, the value of U bit 313 is a logical zero, then status bits 218 are passed to control bus 271 and read.

A trap checking mechanism is another mechanism that reads either status bits 303 or status bits 218, depending upon the value of U bit 313. A trap checking mechanism decides whether to generate traps based on the value of the result-status bits.

To the software, status mechanism 250 appears as if it was floating-point status register fsr 108. When the software wishes to read the status information from the mechanism 250, the software does not specify status bits 303 or status bits 218. Rather, U bit 313 determines whether the software will get the contents of status bits 303 or the contents of status bits 218.

With mechanism 250, pipeline status information can be saved when a process is preempted or when a trap handler performs pipelined operations using the same pipeline. The status information can be restored when resuming the interrupted code. This in turn allows a trap to be taken in the middle of a sequence of computer operations and allows resumption of the sequence of computer operations at a later time.

Traps are caused by exceptional conditions (also called "exceptions") detected in programs or by external interrupts. Traps cause interruption of normal program flow in order to execute a trap handler program. The types of traps include instruction fault, floating-point fault, instruction access fault, data access fault, interrupt, and reset. Floating-point faults include a floating-point source exception and a floating-point result exception.

The class of result exceptions includes any of the following conditions:

(1) Overflow. The absolute value of the rounded true result would exceed the largest finite number in the destination format.

(2) Underflow (when FZ bit 152 is clear). The absolute value of the rounded true result would be smaller than the smallest normalized finite number in the destination format.

(3) Inexact result (when TI bit 154 is set). The result is not exactly representable in the destination format. For example, the fraction one-third cannot be precisely represented in binary form.

For pipelined operations, result exceptions are reported when the result is in the last stage and the next floating-point instruction or floating-point store is executed. When a trap occurs, the pipeline is not advanced, and the last stage results that cause the trap remain unchanged.

When a trap occurs, microprocessor 10 begins executing the trap handler by transferring execution to virtual address 0xFFFFFF00. The trap handler begins execution in single-instruction mode. The trap handler must examine the trap type bits in register psr 98 and epsr 100 of FIG. 2 to determine the cause or causes of the trap.

Returning from a trap handler involves several steps, including restoring the pipeline states. Restoring the pipeline states includes restoring the results in the pipeline and also restoring the fsr 108, KR 31, KI 29, T 35, and MERGE 47 registers, where necessary.

As discussed above, each of the four pipelines (i.e., the adder, multiplier, load, and graphics) contains state information. The pipeline state is saved when a process is preempted or when a trap handler performs pipelined operations using the same pipeline. The state is restored when resuming the interrupted code.

Figure 5A:
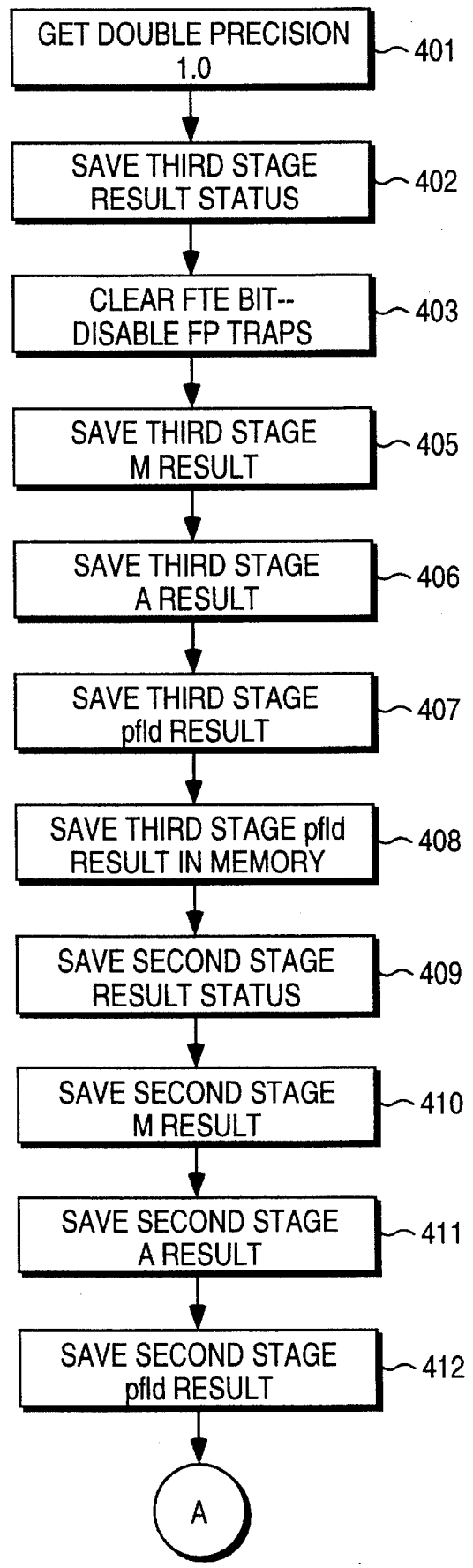
FIGS. 5A and 5B sets forth steps for saving pipeline states of the processor.
Figure 5B:
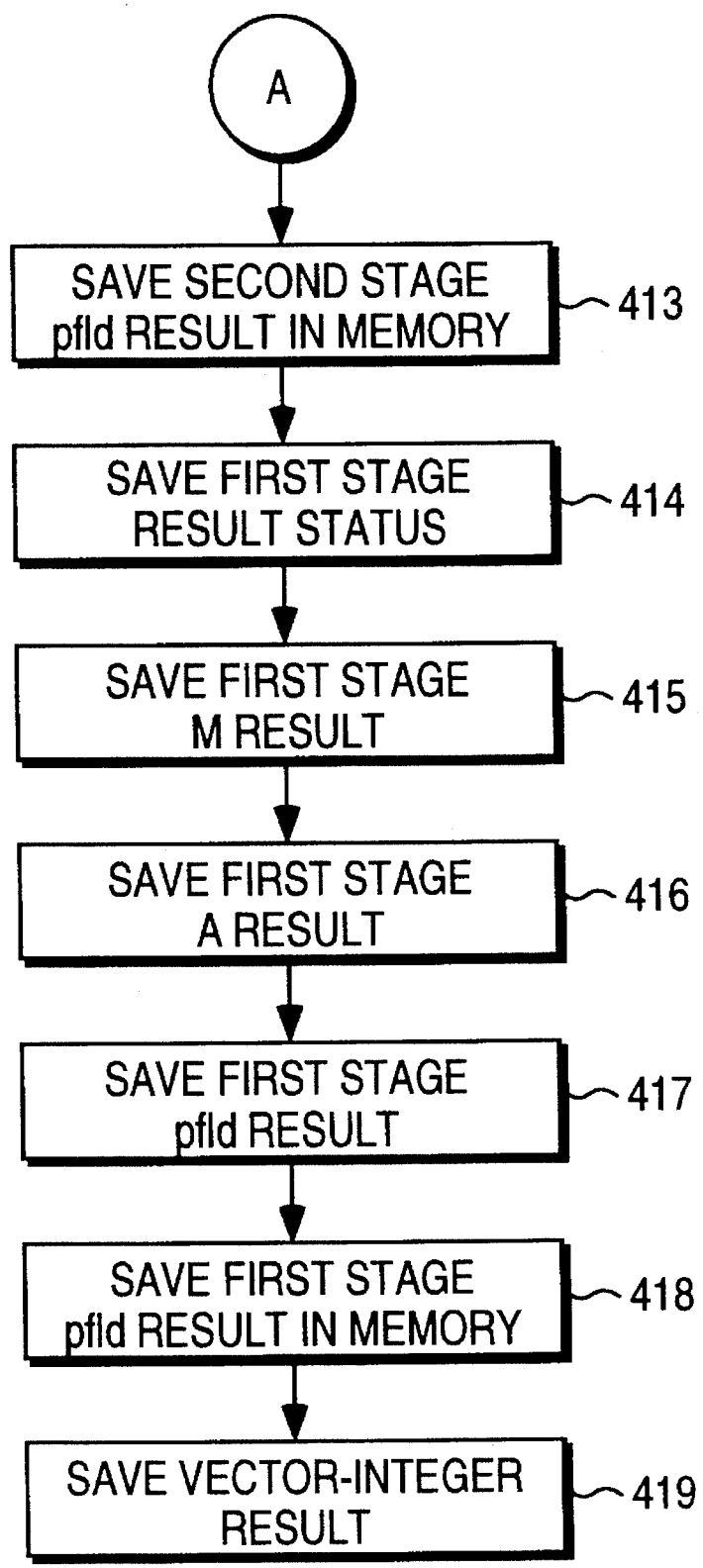
Figure 6A:
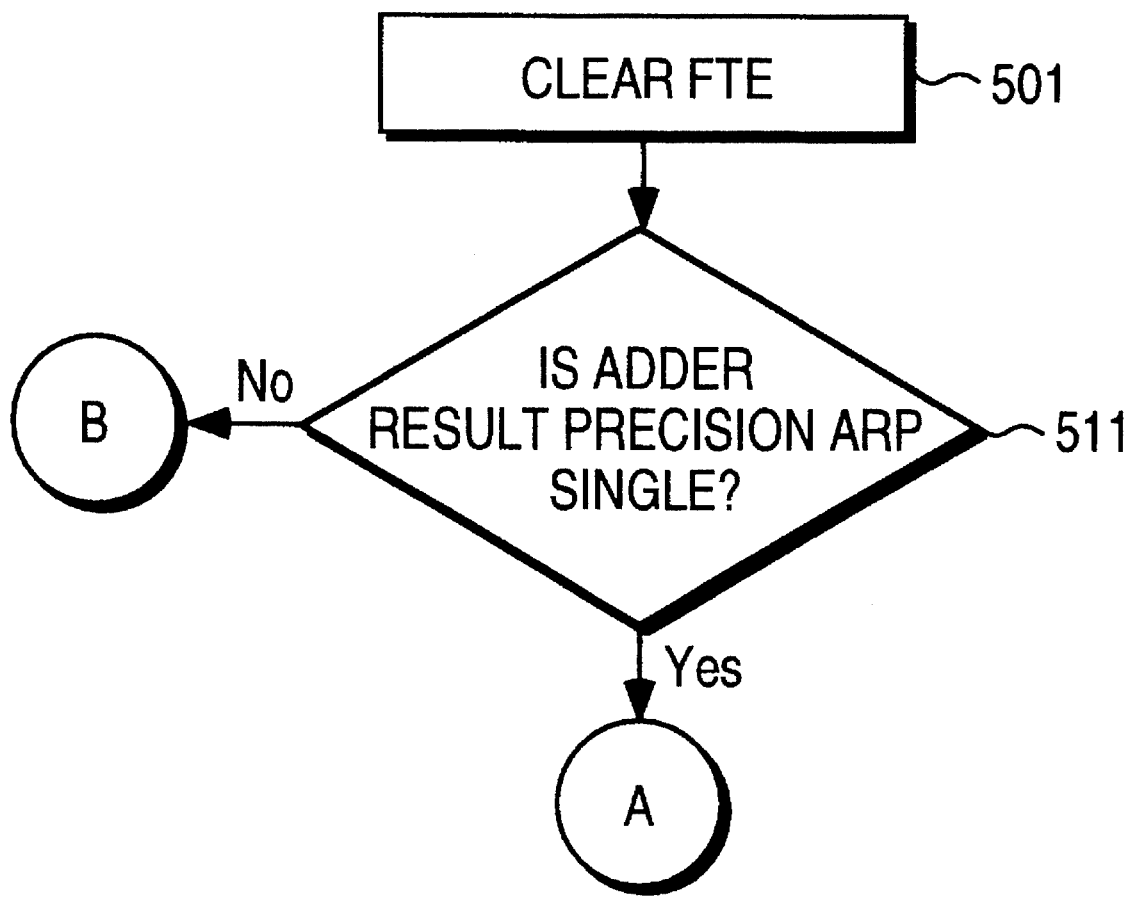
Figure 6B:
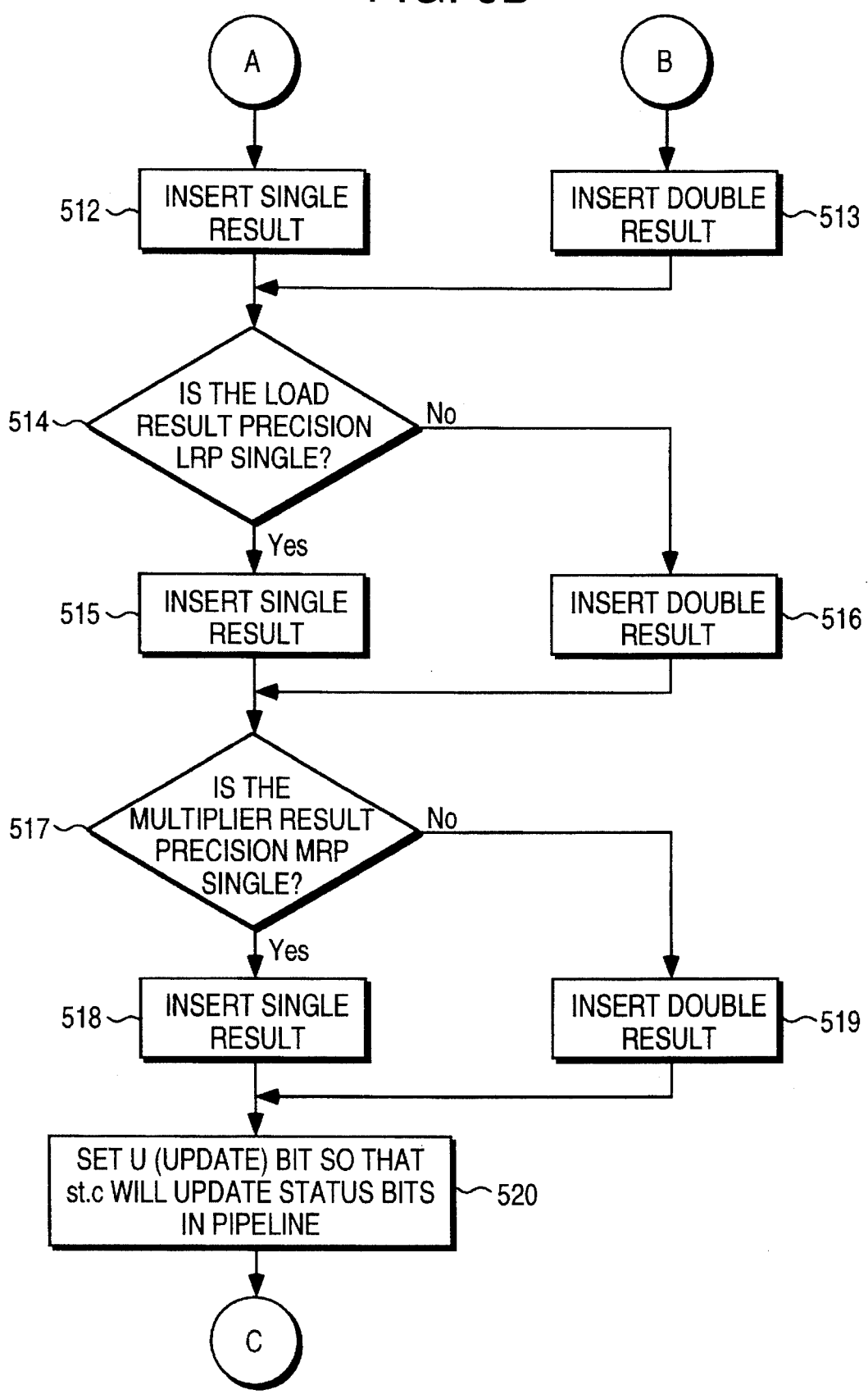
Figure 6C:
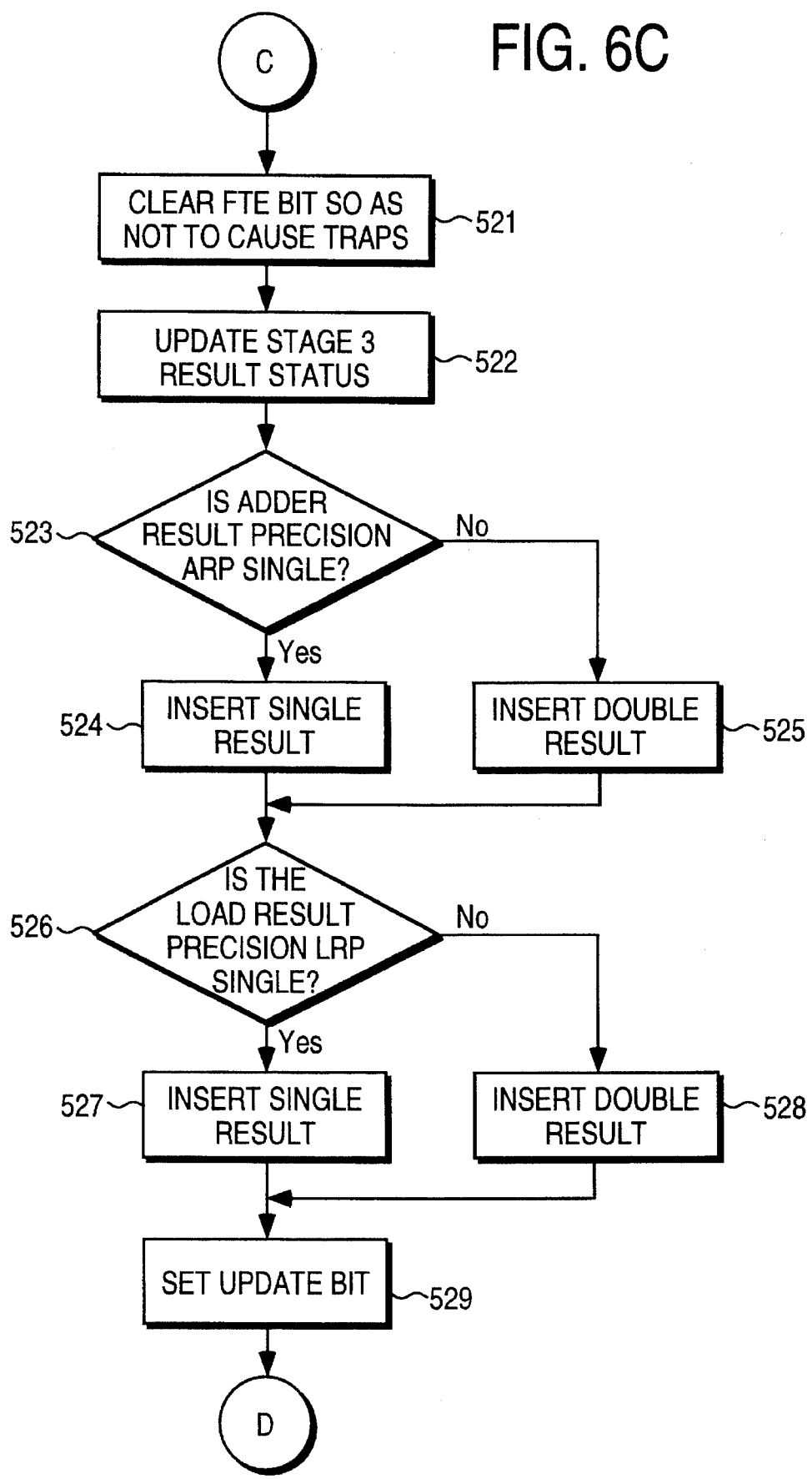
Figure 6D:
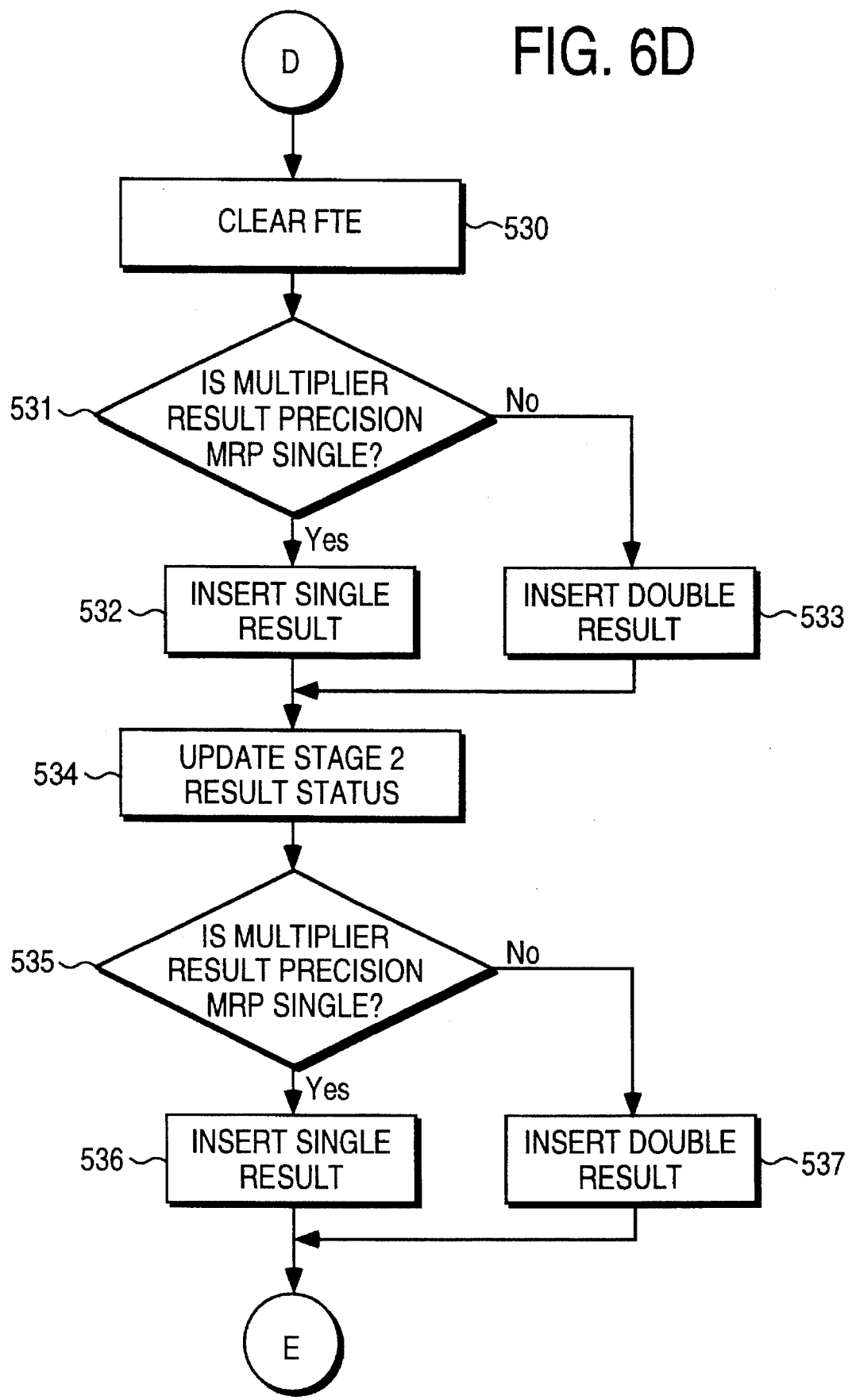
Figure 6E:
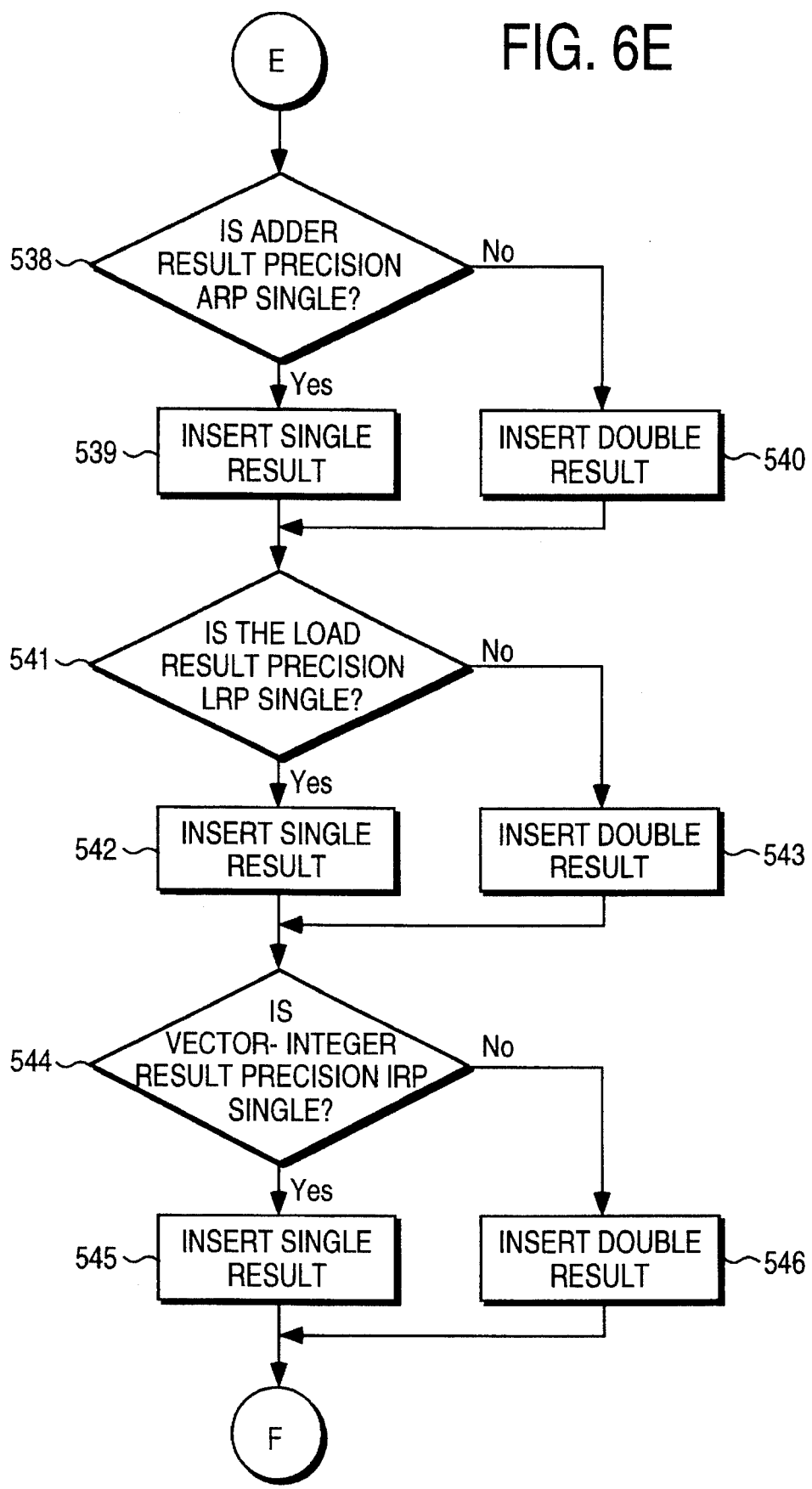

FIGS. 5A and 5B set forth the steps for saving the pipeline states into registers or memory for a three-stage execution floating-point pipeline. In particular, the steps of FIGS. 5A and 5B set forth the steps for saving the third, second, and first-stage results. At step 401, the double-precision 1.0 is obtained. At step 402, the third stage result status is saved in a register by performing a load from control register instruction that designates fsr 108 as the control register. At step 403, the FTE bit 160 is cleared, thereby disabling all floating-point traps. At step 405, the third stage result of the multiplier pipeline is saved in a register by performing a pipelined floating-point multiply by one instruction. At step 406, the third stage result of the adder pipeline is saved in a register by performing a pipelined floating-point add zero instruction. At step 407, the third stage result of the load pipeline is saved in a register by performing a pipelined floating-point load instruction. At step 408, the third stage result of the load pipeline is saved in memory. At step 409, the prior second stage result status is saved in a register by performing a load from control register instruction that designates fsr 108 as the control register. At stage 410, the prior second stage result of the multiplier pipeline is saved in a register by performing a pipelined floating-point multiply by one instruction. At step 411, the prior second stage result of the adder pipeline is saved in a register by performing a pipelined floating-point add zero instruction. At stage 412, the prior second stage result of the load pipeline is saved in a register by performing a pipelined floating-point load instruction. At step 413, the prior second stage result of the load pipeline is saved in memory. At step 414, the prior first-stage result status is saved in a register by performing a load from control register instruction that specifies fsr 108 as the control register. At step 415, the prior first-stage result of the multiplier pipeline is saved in a register by performing a pipelined floating-point multiply by one instruction. At step 416, the prior first-stage result of the adder pipeline is saved in a register by performing a pipelined floating-point add zero instruction. At step 417, the prior first-stage result of the load pipeline is saved in a register by performing a pipelined floating-point load instruction. At step 418, the prior first-stage result of the load pipeline is saved in memory. At step 419, the vector integer result is saved. Traps are disabled during the saving of pipeline states to avoid the overhead of taking traps.

FIGS. 6A through 6F set forth in detail the steps for restoring the pipeline states for the three-stage floating point execution pipeline. When storing to floating-point status register 108 with U bit 158 set, the result status bits are loaded into the first state of the pipelines of the floating-point adder 23 and the floating-point multiplier 27. The updated result status bits of the particular unit (i.e., the adder 23 or multiplier 27) are propagated one stage for each pipeline floating-point operation for that unit. When they reach the last stage, they override the normal result status bits computed from the last stage result. Thus, the result status bits in floating-point status register 108 always reflect the last stage result status and cannot be directly set by software.

At step 501, FTE bit 106 is cleared.

Steps 511 through 522 set forth steps for restoring the third stage 203 of the pipelines. At step 511, the adder result precision bit 196 is tested. If bit 196 indicates single precision, then at step 512 the previously-saved single precision third-stage result is inserted into the first stage 201 of the adder pipeline. If, however, the bit 196 indicates double precision, then at step 513 the previously-saved double precision third-stage result is inserted in the first stage 201 of the adder pipeline by performing a pipelined floating-point add instruction that adds zero to that previously-saved third-stage result. At step 514, the load result precision LRP bit 190 is tested. If bit 190 indicates single precision, then at step 515 the previously-saved single precision third-stage result is inserted in the first stage 201 of the load pipeline by performing a pipelined floating point load instruction that loads that previously saved third stage result. If bit 190 indicates double precision, then at step 516 the previously-saved double precision third-stage result is inserted in the first stage of the load pipeline by performing a pipelined floating-point load instruction that loads that previously saved third stage result. At step 517, the multiplier result precision bit 194 is tested. If bit 194 indicates single precision, then at step 518 the previously-saved single precision third-stage result is inserted in the first stage of the multiplier pipeline by performing a pipelined floating-point multiply instruction that multiplies that previously-saved third stage result by one. If bit 194 indicates double precision, then at step 519 the previously-saved double precision third-stage result is inserted in the first stage of the multiplier pipeline by performing a pipelined floating-point multiply instruction that multiplies that previously-saved third stage result by one. At step 520, the update bit 158 is set so that the st.c instruction will update the status bits in the pipeline. At step 521, the FTE bit 160 is cleared so as not to cause traps. At step 522, the stage three result status bits are updated with a store to control register instruction that specifies fsr 108 as the control register.

Steps 523 through 534 set forth steps for restoring the second stage of the pipelines. At step 523, the adder result precision bit ARP 196 is tested. If bit 196 indicates single precision, then at step 524 the previously-saved single precision second-stage result is inserted in the first stage 201 of the adder pipeline by performing a pipelined floating-point add instruction that adds zero to that previously-saved second-stage result. If bit 196 indicates double precision, then at step 525, the previously-saved double precision second-stage result is inserted in the first stage 201 of the adder pipeline by performing a pipelined floating-point add instruction that adds zero to that previously-saved second-stage result. At step 526, the load result precision LRP bit 190 is tested. If bit 190 indicates single precision, then at step 527 the previously-saved single precision second-stage result is inserted in the first stage 201 of the load pipeline by performing a pipelined floating-point load instruction that loads that previously saved second stage result. If bit 190 indicates double precision, then at step 528 the previously-saved double precision second-stage result is inserted in the first stage of the load pipeline by performing a pipelined floating point load instruction that loads that previously saved second-stage result.

At step 530, the update U bit 158 is set. At step 530, the FTE bit 160 is cleared. At step 531, the multiplier result precision MRP bit 194 is tested. If bit 194 indicates single precision, then at step 532, the previously-saved single precision second-stage result is inserted in the first stage of the multiplier pipeline by performing a pipelined floating-point multiply instruction that multiplies that previously-saved second-stage result by one. If bit 194 indicates double precision, then at step 533 the previously-saved double precision second-stage result is inserted in the first stage of the multiplier pipeline. At step 534, the stage two result status bits are updated with a store to control register instruction that specifies fsr 108 as the control register.

Steps 535 through 549 set forth steps for restoring the first stage of the pipelines. At step 535, the multiplier result precision bit MRP 194 is tested. If bit 194 indicates single precision, then at step 536 the previously-saved single precision first-stage result is inserted in the first stage of the multiplier pipeline by performing a pipelined floating-point multiply instruction that multiplies that previously-saved first-stage result by one. If bit 194 indicates double precision, then at step 537 the previously-saved double precision first-stage result is inserted in the first stage of the multiplier pipeline by performing a pipelined floating-point multiply instruction that multiplies that previously-saved first-stage result by one. At step 538, the adder result precision bit ARP 196 is tested. If bit 196 indicates single precision, then at step 539 the previously-saved single precision first-stage result is inserted in the first stage 201 of the adder pipeline by performing a pipelined floating-point add instruction that adds zero to that previously-saved first-stage result. If bit 196 indicates double precision, then at step 540, the previously-saved double precision first-stage result is inserted in the first stage 201 of the adder pipeline by performing a pipelined floating-point add instruction that adds zero to that previously-saved first-stage result. At step 541 the load result precision bit 191 is tested. If bit 191 indicates single precision, then at step 542 the previously-saved single precision first-stage result is inserted in the first stage 201 of the load pipeline by performing a pipelining floating-point load instruction that loads that previously saved first-stage result. If bit 191 indicates double precision, then at step 543 the previously-saved double precision first-stage result is inserted in the first stage 201 of the load pipeline by performing a pipelined floating-point load instruction that loads that previously-saved first-stage result. At step 544, the vector-integer result precision IRP bit 192 is tested. If bit 192 indicates single precision, then at step 545 the previously-saved single precision first stage result is inserted in the first stage of the load pipeline by performing a pipelined long integer add. If bit 192 indicates double precision, then at step 546 the previously-saved double precision first-stage result is inserted in the first stage of the load pipeline by performing a pipelined long integer add. At step 547, the update U bit 158 is set. At step 548, the stage one result status bits are updated with a store to control register instruction that specifies fsr 108 as the control register. At step 549, the nonpipelined floating-point status register 108 status bits are restored.

Appendix 1 sets forth the source code for microprocessor 10 for saving the pipeline states. Appendix 2 sets forth the source code for microprocessor 10 for restoring the pipeline states. The symbols Mres3, Ares3, Mres2, Ares2, Mres1, Ares1, and Ires1 KR, KI, and T refer to 64-bit floating-point bit registers. The symbols fsr3, fsr2, fsr1, Mergelo32, Mergehi32, and Temp refer to integer registers. The symbols Lres3m, Lres2m, and Lres1m refer to memory locations. The symbol Dummy represents an addressing mode that refers to some readable location that is always present—for example, 0(r0).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

APPENDIX 1

```
// Save third, second, and first stage results
    fld.d      DoubOne,              f4         // get double-precision 1.0
    ld.c       fsr,       Fsr3,                 // save third stage result status
    andnot     0x20,      Fsr3,      Temp       // clear FTE bit
    st.c       Temp,      fsr                   // disable FP traps
    pfmul.ss   f0,        f0,        Mres3      // save third stage M result
    pfadd.ss   f0,        f0         Ares3      // save third stage A result
    pfld.d     Dummy,     Lres                  // save third stage pfld result
    fst.d      Lres,      Lres3m                // . . . in memory
    ld.c       fsr,       Fsr2                  // save second stage result status
    pfmul.ss   f0,        f0,        Mres2      // save second stage M result
    pfadd.ss   f0,        f0,        Ares2      // save second stage A result
    pfld.d     Dummy,     Lres                  // save second stage pfld result
    fst.d      Lres,      Lres2m                // . . . in memory
    ld.c       fsr,       Fsr1                  // save first stage result status
    pfmul.ss   f0,        f0         Mres1      // save first stage M result
    pfadd.ss   f0,        f0,        Ares1      // save first stage A result
    pfld.d     Dummy,     Lres                  // save first stage pfld result
```

APPENDIX 1-continued

| | | | | |
|---|---|---|---|---|
| fst.d | Lres, | Lresm | | // . . . in memory |
| pfiadd.dd | f0, | f0, | Ires1 | // save vector-integer result |
| // Save KR, KI, T, and MERGE | | | | |
| r2apt.dd | f0, | f4, | f0 | // M first stage contains KR |
| | | | | // A first stage contains T |
| i2p.dd | f0, | f4, | f0 | // M first stage contains KI |
| pfmul.dd | f0, | f0, | KR | // Save KR register |
| pfmul.dd | f0, | f0, | KI | // Save KI register |
| pfadd.dd | f0, | f0, | f0 | // adder third stage gets T |
| pfadd.dd | f0, | f0, | T | // save T-register |
| form | f0, | | f2 | // save MERGE register |
| fxfr | f2, | Mergelo32 | | |
| fxfr | f3, | Mergehi32 | | |

APPENDIX 2

| | | | | |
|---|---|---|---|---|
| st.c | r0, | fsr | | // clear FTE |
| // Restore MERGE | | | | |
| shl | 16, | Mergelo32, | r1 | // move low 16 bits to high 16 |
| ixfr | r1, | f2 | | |
| shl | 16, | Mergehi32, | r1 | // move low 16 bits to high 16 |
| ixfr | r1, | f3 | | |
| ixfr | Mergelo32, | | f4 | |
| ixfr | Mergehi32, | | f5 | |
| faddz | f0, | f2, | f0 | // merge low 16s |
| faddz | f0, | f4, | f0 | // merge high 16s |
| // Restore KR, KI, and T | | | | |
| fld.l | SingOne, | | f2 | // get single-precision 1.0 |
| fld.d | DoubOne, | | f4 | // get double-precision 1.0 |
| pfmul.dd | f4 | T, | f0 | // put value of T in M 1st stage |
| r2pt.dd | KR, | f0, | f0 | // load KR, advance t |
| i2apt.dd | KI, | f0, | f0 | // load KI and T |
| // Restore 3rd stage | | | | |
| andh | 0x2000, | Fsr3, | r0 | // test adder result precision ARP |
| bc.t | L0 | | | // taken if it was single |
| pfadd.ss | Ares3, | f0, | f0 | // insert single result |
| pfadd.dd | Ares3, | f0, | f0 | // insert double result |
| L0:orh | ha%Lres3m, | r0, | r31 | |
| andh | 0x400, | Fsr3, | r0 | // test load resoft precision LRP |
| bc.t | L1 | | | // taken if it was single |
| pfld.l | l%Lres3m(r31), | | f0 | // insert single result |
| pfld.d | l%Lres3m(r31), | | f0 | // insert double result |
| L1:andh | 0x1000, | Fsr3, | r0 | // test multiplier result precision MRP |
| bc.t | L2 | | | // taken if it was single |
| pfmul.ss | Mres3, | f2, | f0 | // insert single result |
| pfmul3.dd | Mres3, | f4, | f0 | // insert double result |
| L2:or | 0x10, | Fsr3, | Temp | // set U (update) bit so that st.c |
| | | | | // will update status bits in pipeline |
| andnot | 0x20, | Temp, | Temp | // clear FTE bit so as not to cause traps |
| st.c | Temp , | fsr | | // update stage 3 result status |
| // Restore 2nd stage | | | | |
| andh | 0x2000, | Fsr2, | r0 | // test adder result precision ARP |
| bc.t | L3 | | | // taken if it was single |
| pfadd.ss | Ares2, | f0 | f0 | // insert single result |
| pfadd.dd | Ares2, | f0 | f0 | // insert double result |
| L3:orh | ha%/Lres2m, | ro, | r31 | |
| andh | 0x400, | Fsr2, | r0 | // test load result precision LRP |
| bc.t | L4 | | | // taken if it was single |
| pfld.l | 1%Lres2m(r31), | | f0 | // insert single result |
| pfld.d | 1%Lres2m(r31), | | f0 | // insert double result |
| L4:or | 0x10, | Fsr2, | Temp | // set update bit |
| andnot | 0x20, | Temp, | Temp | // clear FTE |
| andh | 0x1000, | Fsr2, | r0 | // test multiplier result precision MRP |
| bc.t | L5 | | | // taken if it was single |
| pfmul.ss | Mres2, | f2, | f0 | // insert single result |
| pfmul3.dd | Mres2, | f4, | f0 | // insert double result |
| L5:st.c | Temp, | fsr | | // update stage 2 result status |
| // Restore 1st stage | | | | |
| andh | 0x1000, | Fsr1, | r0 | // test multiplier result precision MRP |
| bc.t | L6 | | | // skip next if double |
| pfmul.ss | Mres1, | f2, | f0 | // insert single result |
| pfmul3.dd | Mres1, | f4, | f0 | // insert double result |
| L6:andh | 0x2000, | Fsr1, | r0 | // test adder result precision ARP |
| bc.t | L7 | | | // taken if it was single |
| pfadd.ss | Ares1, | f0, | f0 | // insert single result |
| L7:orh | ha%Lres1m, | ro, | r31 | |
| andh | 0x4000, | Fsr1 | r0 | // test load result precision LRP |

APPENDIX 2-continued

```
bc.t        L8                              // taken if it was single
pfld.l      l%Lreslm(r31),        f0        // insert single result
pfld.d      l%Lreslm(r31),        f0        // insert double result
L8:andh     0x800,      Fsr1,     r0        // test vector-integer result precision IRP
bc.t        L9                              // taken if it was single
pfiadd.ss   f0,   lres1,  f0                // insert single result
pfiadd.dd   f0,   lresl,  f0                // insert double result
L9:or       0x10,       Fsr1,     Fsr1      // set U (update) bit
st.c        Fsr1,       fsr                 // update stage 1 result status
st.c        Fsr3,       fsr                 // restore nonpipelined FSR status
```

What is claimed is:

1. In a pipelined processor having a plurality of stages including a first stage that receives an instruction and a last stage that provides pipeline-generated normal result status data responsive to execution of said instruction by previous stages, a method for updating a processor state with said normal result status data or saved result status data previously saved responsive to an interruption in normal processing, comprising the steps of:

(a) supplying an update bit to an update memory element associated with said last stage;

(b) supplying said update bit from the last stage to a selector circuit;

(c) responsive to said update bit, in said selector circuit selecting said normal result status data or said saved result status data; and (d) supplying said data selected in said step (c) to update the processor state.

2. In a pipelined processor having N stages including a first stage that receives an instruction and a last stage path that provides pipeline-generated normal result status bits responsive to execution of said instruction by previous stages, a method for restoring saved result status data previously saved for each of said N stages following an interruption in normal processing, comprising the steps of:

(a) in an injected result path having a plurality of injection result status memory elements respectively associated with each of said N stages, sequentially loading said injection result status memory elements with said previously saved result status data;

(b) simultaneously with said previous step (a), sequentially loading an update memory element with a corresponding asserted update bit for each of said N stages so that an asserted update bit is associated with each stage loaded with injected result status data;

(c) supplying said update bit associated with said last stage path to a selector circuit, and responsive thereto, selecting result status data in said injected result status path corresponding to the update bit, the data being status restoring information; and (d) supplying said result status data selected in the step (c) to update the processor state and restoring the saved result status data.

3. The method of claim 2, wherein the processor includes a floating point adder pipeline, and the step (b) or (d) includes storing saved result status bits that include:

(1) an adder add one bit;

(2) an adder inexact bit;

(3) an adder overflow bit;

(4) an adder underflow bit; and (5) an adder exponent bit.

4. The method of claim 2, wherein the pipeline includes a floating point multiply pipeline, and the step (b) or (d) includes storing saved result status bits that include:

(1) a multiplier add one bit;

(2) a multiplier inexact bit;

(3) a multiplier overflow bit; and (4) a multiplier underflow bit.

5. Circuitry for saving and restoring the state of an N-stage pipelined computer including a first stage that receives an instruction and a last stage, said pipelined computer having a memory to which said status information is saved and from which said status information is retrieved, said circuitry comprising:

a last stage circuit path for computing pipeline-generated normal result status bits for pipelined instruction operations executed in the last stage of the pipeline;

an update memory element having a corresponding update bit for each of the N pipeline stages;

an injected result path having a plurality of injection result status bits respectively associated with each of said N stages, the injection result status bits for sequential loading with result status bits saved following an interruption during normal processing;

a pipeline advancing circuit for advancing the update bits and injected result status bits sequentially into the next pipeline stage;

a restoring circuit for controlling the advancing circuit to sequentially store the status information in said plurality of injected result status bits for each of the N pipeline stages, said restoring circuit for restoring said saved status information for each of the N pipeline stages into the stages from which they were saved, so that the injected result status bits are restored into the pipeline; and a selector circuit, responsive to the update bit from the last stage path, for selecting between the last stage injected result status bits and the pipeline-generated normal result status bits and providing said selected data to a control register bus to update the processor state.

6. The circuitry of claim 5 further comprising a disabling circuit for disabling traps during loading into the first stage update bit and first stage injected result status data.

7. The circuitry of claim 5, wherein said pipeline includes a floating point adder pipeline, and the plurality of injected result status data and the pipeline-generated result status data include:

(a) an adder add one bit;

(b) an adder inexact bit;

(c) an adder overflow bit;

(d) an adder underflow bit; and (e) an adder exponent bit.

8. The circuitry of claim 5, wherein said pipeline includes a floating point multiplier pipeline, and the injected result status data, the pipeline-generated result status data include:

(a) an multiplier add one bit;

(b) an multiplier inexact bit;

(c) an multiplier overflow bit; and (d) an multiplier underflow bit.

9. The circuitry of claim 5, wherein the state information associated with each stage of the pipeline includes precision bits, said precision bits indicating whether the associated stage is operating in single or double precision.

10. The circuitry of claim 5, wherein the processor includes multiple pipelines, at least one of said pipelines having a number of stages other than N.

* * * * *

UNITED STATES PATENT AND TRADEMARK OFFICE
CERTIFICATE OF CORRECTION

PATENT NO. : 5,546,551
DATED : August 13, 1996
INVENTOR(S) : Leslie D. Kohn

It is certified that error appears in the above-identified patent and that said Letters Patent is hereby corrected as shown below:

Column 11 and 12,
In Appendix 2 at line 23 delete "test load resoft" and insert --test load result--

Signed and Sealed this

Seventeenth Day of December, 1996

BRUCE LEHMAN

Attest:

Attesting Officer

Commissioner of Patents and Trademarks